2,801,876

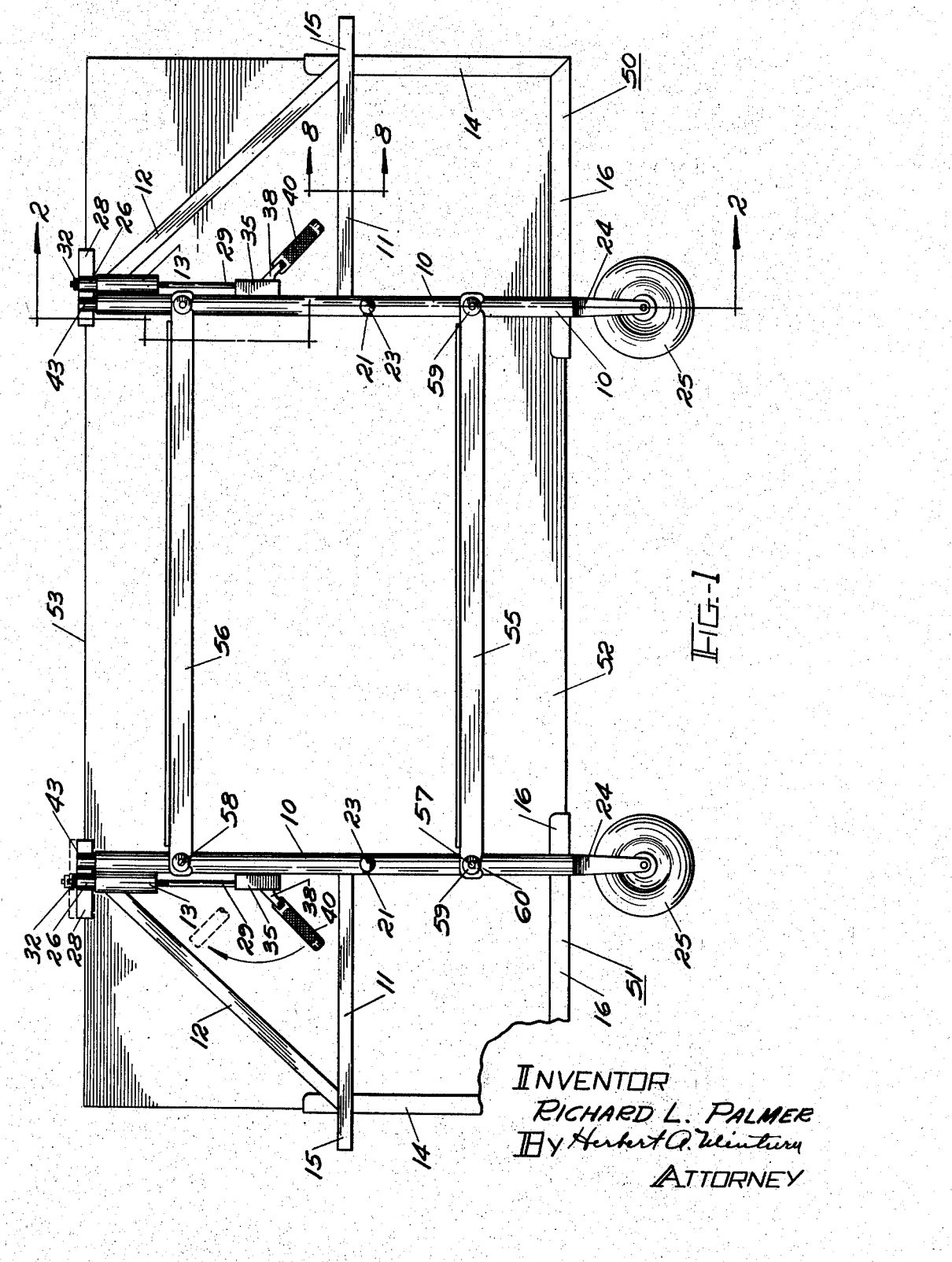

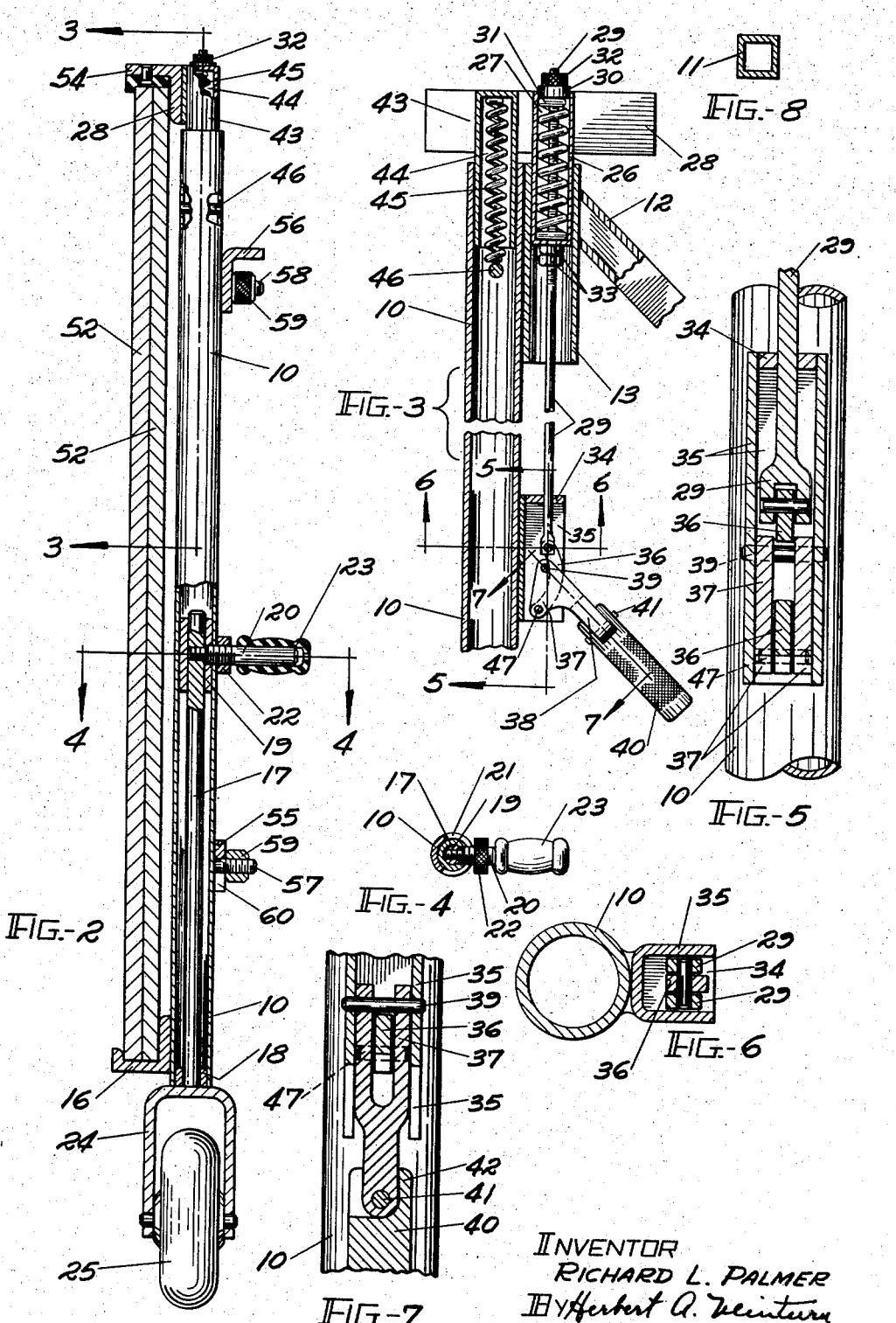

PANEL HANDLER CLAMP

Richard L. Palmer, Indianapolis, Ind., assignor to Palmer Industries, Inc., a corporation of Indiana Application January 3, 1956, Serial No. 556,993

5 Claims. (Cl. 294—103)

Reference is made to my application, Serial Number 525,593, filed August 1, 1955, terminating in Patent Number 2,774,607, December 18, 1956, of which this application is a continuation-in-part.

This invention relates to a device generally incorporated in two companion structures for the purpose of quickly attaching and detaching the structures to panels such as sheets of wall board whether of the plaster type or of plywood; composition sheets; and even side walls of a prefabricated nature for building; and in fact for any panel of any conceivable material or nature even including sheet metal, which has to be handled in the panel form and particularlly moved from shipping trucks to the job and then positioned at the zone where it is to be used.

The invention particularly involves the clamping device carried by a frame work which may be clamped to one or more of the panels as a unit, and this frame work carries wheels so that the weight of the panels to be moved is taken by wheels, and moreover the package of panels, if there be more than one, may be wheeled about within very limited spaces such as are encountered particularly in frame houses where the studding is spaced on sixteen inch centers and the sheets or panels may be of quite long dimensions such for example as fourteen feet which is the dimension of one particular standard size of wall board.

It is generally conceded that the use of wall board for making what is termed "dry wall" finished walls where the boards themselves are preformed out of some material including gypsum, tend to become standard construction. This material comes in sheets of different lengths such as eight feet, ten feet, twelve feet, and fourteen feet, and in four foot widths. It is highly desirable to have the sheets in the longest possible lengths in order that the minimum number of taped joints occur in the wall or ceiling. The edges of these sheets of wall board are generally beveled and two of these sheets are taped together in order to protect the edges and ends from becoming damaged during the shipping and handling of those boards prior to installation on the studding in the building. Two of these sheets, fourteen feet long will weigh in the neighborhood of two hundred and sixty pounds. Also sheets four feet wide and fourteen feet long of this combined weight are exceedingly difficult to handle, and this difficulty in handling has been quite a problem, in fact so much of a problem that there is considerable resistance in the selling and using of this material simply on account of the difficulty in taking the boards from a flat condition from a stack thereof, placing them on a truck also in a flat condition, and then removing the boards from the truck and carrying them into the building and into the particular room where the material will finally be used.

It has required as many as three or four men to handle a pair of these boards, and due to the fact it is extremely awkward to get hold of the boards, the laborer handling the boards puts himself under a terrible strain in respect to his back muscles in trying to carry these boards even after he had lifted them up from the stack and placed them in an upright position. While reference has been made to these boards being carried in flat condition in stacks, that condition is considered necessary in order to protect the edges and ends of the boards, because the gypsum board material is quite fragile when struck or knocked along the edges although it does make a good solid wall finish.

The present invention has arisen as means for overcoming the objections which have been found in the handling of this material, so that it may be handled much easier and without the heretofore terrific strain on back muscles. While the invention is herein described in reference to the handling of wall board, as previously indicated, the material handled will be in panels, but those panels may be of a wide range of material, and therefore the invention is not limited specifically to handling wall board.

The invention provides for gripping the edges and ends of the wall board in a very thorough and practical manner, and clamping the frame work to the panels when in their horizontally disposed positions, following which the panels may be lifted by grasping the structure clamped thereto, and slid off of the pile and down on to the wheels which are a part of the handling structure. Once the panels are on edge in this handling structure, they may be wheeled to the desired position as above indicated, particularly in view of the fact that the structure incorporates a steering mechanism for the wheels in order that the panels may be shifted easily around corners and the like. The structure may be made at a relatively low cost and thus be within the range of permissible cost of handling of the panels particularly in view of the saving in time of the laborer.

These and many other objects and advantages of the invention will become apparent to those versed in the art in the following description of one particular form of the invention as illustrated in the accompanying drawings, in which:

Fig. 1 is a view in side elevation of a structure embodying the invention;

Fig. 2 is a view in vertical section on the line 2—2 in Fig. 1;

Fig. 3 is a view on an enlarged scale in vertical section on the line 3—3 in Fig. 2;

Fig. 4 is a horizontal section on the line 4—4 in Fig. 2;

Fig. 5 is a further enlarged view in detail in side elevation and partial section on the line 5—5 in Fig. 3;

Fig. 6 is a view in transverse section on an enlarged scale on the line 6—6 in Fig. 3;

Fig. 7 is a detail in section and on an enlarged scale on the line 7—7 in Fig. 3; and Fig. 8 is a view in transverse section on the line 8—8 in Fig. 1.

A post 10 may be selected to have any suitable structural form, herein shown as being tubular in nature. To this position 10 there is fixed by any suitable means such as by welding, a horizontally disposed member 11 and from an outer end portion of this member there extends a diagonal brace member 12 inclining toward the upper end of the post 10.

In the form herein shown, the post 10 is cylindrical in shape, and there is secured thereto at the upper end portion thereof a short cylinder 13, extending along the side of the post 10, and being connected thereto by any suitable means such as by welding, and it is to this short cylinder 13 that the upper end of the brace 12 is fixed. All as indicated in Figure 1.

An angle iron 14 is fixed in a vertically disposed position to extend downwardly from an outer end portion of the member 11 in a fixed manner, a short end portion of the member 11 extending beyond the angle iron 14 to form a handle 15.

A horizontally disposed angle iron member 16 is fixed to the lower end of the post 10 and extends outwardly therefrom to join with the lower end of the angle iron 14.

Preferably a short length of the angle iron member 16 extends to the opposite side of the post 10 as indicated in Fig. 1.

A stem 17 enters the post 10 from the lower end through any suitable type of bearing 18 which may be of any desired type of an anti-friction nature or may be a smooth bearing as herein shown, and extends on upwardly within the post 10 to extend through a sleeve bearing 19 which revolubly fits within the post 10.

This stem 17 is maintained within the post 10 by means of a handle pin 20 which extends through a slot 21 in the post 10 and screw-threadedly engages the stem 17 as indicated in Figs. 2 and 4. The slot 21 preferably exceeds in its horizontal length 180 degrees. There is carried a nut 22 screw-threadedly externally of the post 10 to be selectively carried along with stem against the side of the post 10 as a means of retaining the stem 17 in a fixed position of rotation. On the outer end of the pin 20, there is preferably mounted a hand grip 23 as a means for rotating the stem 17 when the nut 22 is retracted along the pin 20 away from contact with the post 10.

There is fixed a fork 24 on the lower end of the stem 17 which will have a top side bearing against the inner bearing 18 positioned at the lower end of post 10. Fork 24 carries a wheel 25, preferably of a pneumatic type.

The sleeve 19 not only serves as a bearing between the stem 17 and the post 10, but also serves to reinforce the post 10 to prevent bending of the post 10 across the slot 21. Thus, the combined stem 17 through the bearing 19 and the bearing itself serve effectively to stiffen the post 10 past the weakened zone set up by the transverse slot 21.

A piston 26, of a cylindrical nature and having a bore 27 therein closed at the bottom and open at the top is fixed to a short transverse length of angle iron 28 along the side so as to place the angle iron 28 in parallelism with the lower angle iron member 16 and on the same side of the post 10. A connecting rod 29 enters axially of the tube 13 and extends up axially into the piston 26, to carry an upper bearing 30 with a sliding fit internally of the piston 26. Between the member 30 and the floor or closed end of the piston 26, is a compression spring 31 surrounding the connecting rod and bearing by its ends between that member 30 and the closed end of the piston 26. There is a nut 32 screw-threadedly engaging the connecting rod 29 on its upper end so as to maintain the member 30 in contact with the spring 31. Also there is a positive stop carried by the connecting rod 29 under the piston 26 within the cylinder 13, herein shown as consisting of a pair of lock nuts 33.

The lower end of the connecting rod 29 is slidingly passed through a top member 34 of a bracket 35 and is rockably connected to an arcuate length 36 which in turn is rockably connected to an ear 37 extending from one side of a lever base 38 in turn rockably supported on a transverse pin 39 carried by the bracket 35, Figs. 3 and 5. In the form herein shown the ear 37 is bifurcated so as to straddle the length 36. The angle iron 28 is shown in its lowermost position as is produced by the member 38 being rocked downwardly into the position as indicated in Fig. 3. The base member 38 has a rockable hand grip 40 secured thereto by means of a pin 41. The interconnection of the handle 40 is that as indicated in Fig. 7, wherein the handle 40 normally being on an inclined position as indicated in Fig. 3, may be rocked outwardly somewhat so as to give free access to the handle 40 by reason of the fact that the handle 40 straddles the member 38, and has an upper lip 42 engaging the relatively back side of the member 38 to limit travel in that direction, but permitting outward travel. It is to be noted that the pin 41 is in a position transversely of the rocking direction of the handle 40 about the pin 39 so that the rocking of the handle 40 outwardly does not interfere in that operation.

A piston 43 has a bore 44 therein closed at the top but open at the underside, and is slidably fitted in the upper end of the post 10, Figs. 2 and 3. A compression spring 45 is carried within the piston 43 to bear against its upper closed end, and also by a lower end against the transverse pin 46 extending through the post 10. The piston 43 is fixed to the angle iron 28 to hold the angle iron 28 in parallelism with the lower angle iron member 16 and thus prevent rotation of the member 28 about the axis of the connecting rod 29. The spring 45 may be compressed with less force than may be the spring 31.

The structure so far described constitutes a right hand frame which may be generally designated by the numeral 50. A similar structure designated by the numeral 51 is identical in all respects with the exception that it is made in a left hand form as opposed to the right hand form frame 50.

*Operation*

The right and left hand frames 50 and 51 are brought up to a stack of sheets of wall board, plywood, or whatever is to be handled. The invention is directed primarily to the handling of wall board which comprises a pair of outside paper covering sheets between which is a filling of gypsum which of course is quite fragile and must not be broken between the sheets of paper, otherwise there will be a disfigurement eventually in the wall or the ceiling of the room to which the plasterboard is applied. These sheets of wall board are customarily packed two together by the use of a paper tape around the edges and ends. As indicated in Fig. 2, the lower and top angle members 16 and 28 are sufficiently wide in their horizontally disposed legs to receive thereon and therebetween the double thickness of the wall board. Obviously the legs of both of these members 16 and 28 may be made longer to accommodate a greater number of the sheets of wall board, but the number of sheets is limited by the weight which can be handled by one or two men.

In any event, as indicated, the frames 50 and 51 are laid over the uppermost sheet 52, Fig. 1, to have the lower angle bar members 16 brought up against the edges of the wall board snugly and then the relatively upper angle bar members 28 are dropped down over the opposite side edges of the wall board. Normally the upper angle bar member 28 will be extended in its fartherest spaced relation from the lower angle bar member 16 in each instance, this spacing being achieved by rocking the handle 40 in each instance, particularly as indicated in connection with the left hand frame 51, Fig. 1, to an upper position such as indicated by the dash line position, following the direction of the arrow which will bring the member 28 to a position such as indicated by the dash line. The two handles 40 may then be rocked downwardly to their normal bottom line position as indicated in Fig. 1, and this action will bring the upper angle bar members 28 in compressive engagement with the upper edge 53 of the board 52, gripping it between that member 28 in each instance and the lower member 16 of each frame.

In setting up this gripping action of the opposing edges of the wall board, rocking of the handle 40 in a clockwise direction, Fig. 3, will pull the angle bar 28 downwardly by exertion of pressure on the spring 31 tending to force the piston 26 downwardly in the cylinder 13, at the same time compressing the spring 45 within the spiston 43 against its lower stop pin 46. The handle 40 is carried on downwardly in its rocking action to the lowermost positions as indicated for both frames in Fig. 1, in which positions, the angle bar 28 will have gripped the one or more sheets 52 of the wall board by the horizontally extending leg 54, Fig. 2, and then an increasing, yielding pressure is set up by reason of the spring 31 being further compressed by downward pull of the piston 26 under the pressure applied to the top end of the spring 31, until the lowermost travel of the handle 40 is reached, and the pin 47 is carried to the left of a vertical line through the connection of the lower end of the connecting rod 29 with the link 36 and the pivot pin 39 of the handle 40, whereby the spring 31 is then maintained under pressure to maintain that yielding compressive engagement of the wall board.

Then the wall board 52 is ready to be transported by shifting it around from the stack to a more or less vertically disposed position as indicated in Fig. 2, whereupon the wall boards thus engaged may be carried or rather transported to the desired location.

The vertically disposed angle irons 14 protect the end edges of the wall board 52, and serve to prevent any longitudinal displacement of the board in respect to the lower angle bar members 16. The direction of travel of the wall board 52 as it is transported is controlled by the operator who may grip the outwardly extending portion 15 of the horizontally disposed bars 11, and at the same time grip the handle 23 and turn the load carrying wheels 25 to any direction that may be desired within the limits of turning set up by the length of slot 21. Of course the steering may be dispensed with by running the nut 22 up to hold the wheels 25 in more or less parallel alignment with the wall board 52, when such action is desired. Such locking or rather securing of the stem 17 in a non-rotative position in each instance may be desirable when the device is not to be used, but is being transported from one stack of wall board 52 to another, or may be carried in a truck delivering the wall board to a job.

A further feature is to be pointed out in that the two frames 50 and 51 may be interconnected by any suitable means such as herein shown in Fig. 1, where a pair of angle bar rails 55 and 56 are detachably interconnected by their ends at spaced apart positions along the post 10. Each of the posts 10 of the two frames 50 and 51 is provided with laterally extending studs 57 and 58, one below the handle 23 and the other toward the upper end of the post. A nut 59 is screw-threaded engaged on each of the studs, and may be run down on the stud to compressively force the ends of the two rails 55 and 56 against the respective post by reason of the fact that each of these ends of the rails is vertically slotted to drop down over the stud in each instance, each slot being designated by the numeral 60, Fig. 2, so that the two posts would best be tied together and yet the rails 55 and 56 may be released after the wall board 52 has been transported. The use of these rails 55 and 56 serves first the purpose of preventing undue bending of the board 52 between the posts 10 as it may be transported. Furthermore, another purpose is to make a more or less unitary transporting structure which may be handled by one person where the sheets of wall board 52 have lengths of 8 feet which is the normal, standard length for the majority sheets handled particularly for wall application. These sheets do run up to 14 feet in length, and in that case, the weight is such that two operators must be employed to handle those sheets, primarily due to the great weight and particularly where two sheets may be handled as above indicated. Such sheets of this longer length are normally used for ceiling application in a room.

Therefore, it is to be seen that I have provided an exceedingly simple and yet most effective construction for the purpose intended by the use of the double spring clamping arrangement, the edges of the wall board 52 are compressively engaged with pressure which will retain the wall boards in their held positions and yet the edges will not be damaged or crumpled in any way whatsoever. These edges have to be maintained in straight lines and tipping of them requires quite a bit of additional work on the part of the installer in order to provide a smooth wall surface.

It is to be noted that the spring 45 serves as a means of lifting the angle bar 28 away from the edge of the wallboard 52 when the handle 40 is rocked relatively upwardly and after releasing the pressure exerted by the spring 31. Thus the angle bar 28 in each instance is shifted to the outer position so it does not have to be handled by the hands of the operator for another setting for the next set of boards to be transported.

Therefore, while I have herein shown the structure in more or less minute detail, it is obvious that structural changes may be employed without departing from the spirit of the invention, and consequently I do not desire to be limited to that precise form beyond the limitations which may be imposed by the following claims.

I claim:

1. In a structure for clamp panels of sheet-like material on a carrier, that structure which comprises a carrier member; an abutment on the member on which edges of said panels rest; a shiftable gripping member carried by said carrier member to engage opposite edges of the panels in respect to said first edges; spring means yieldingly urging said gripping member in travel away from said abutment permitting of entrance of panels therebetween; a spring member interconnected with said gripping member; and means selectively deforming said spring member and inducing yielding travel of said gripping member toward said abutment in opposition to said spring means.

2. The structure of claim 1 in which there is means carried by said carrier member guiding said gripping member in both of said travels away from and toward said abutment.

3. The structure of claim 1 in which there are a pair of cylinders each fixed to said gripping member; means carried by said carrier member receiving and guiding said cylinders in directions of said travels; said spring means constituting a compressible coil spring bearing by one end in fixed position on said carrier member and extending by the other end into one of said cylinders from an open end thereof which is directed toward said abutment to bear by a stop carried by the cylinder; and said spring member also being a compressible coil spring and entering by one end into said other cylinder from an open end thereof directed away from said abutment and bearing on a stop carried by said other cylinder.

4. The structure of claim 3 in which said deforming means comprises a rod axially extending through said spring member and said cylinder; an abutment on said rod bearing against that end of the spring member adjacent the open end of said other cylinder; and means setting up travel of said rod tending to compress said spring member within its cylinder.

5. The structure of claim 4 in which said carrier member is a hollow post opening at one end and slidingly receiving therein from said open end said one cylinder.

References Cited in the file of this patent

UNITED STATES PATENTS

| 122,966 | Reynolds | Jan. 23, 1872 |
| 1,303,691 | Le Tempt et al. | May 13, 1919 |
| 1,374,372 | Freund | Apr. 12, 1921 |

FOREIGN PATENTS

| 153,053 | Australia | Sept. 1, 1953 |